United States Patent
Pillai

(10) Patent No.: US 10,503,480 B2
(45) Date of Patent: Dec. 10, 2019

(54) CORRELATION BASED INSTRUMENTS DISCOVERY

(71) Applicants: ENT. SERVICES DEVELOPMENT CORPORATION LP, Houston, TX (US); Vinu Pillai, Bangalore (IN)

(72) Inventor: Vinu Pillai, Bangalore (IN)

(73) Assignee: ENT. SERVICES DEVELOPMENT CORPORATION LP, Houston, TX (US)

(*) Notice: Subject to any disclaimer, the term of this patent is extended or adjusted under 35 U.S.C. 154(b) by 14 days.

(21) Appl. No.: 15/303,661

(22) PCT Filed: Apr. 30, 2014

(86) PCT No.: PCT/IN2014/000290
§ 371 (c)(1),
(2) Date: Oct. 12, 2016

(87) PCT Pub. No.: WO2015/166508
PCT Pub. Date: Nov. 5, 2015

(65) Prior Publication Data
US 2017/0039036 A1    Feb. 9, 2017

(51) Int. Cl.
*G06F 8/20*     (2018.01)
*G06F 17/27*    (2006.01)
(Continued)

(52) U.S. Cl.
CPC .............. *G06F 8/20* (2013.01); *G06F 8/35* (2013.01); *G06F 16/9024* (2019.01); *G06F 17/27* (2013.01)

(58) Field of Classification Search
CPC ............. G06F 8/20–35; G06F 8/00–35; G06F 17/27–2785
See application file for complete search history.

(56) References Cited

U.S. PATENT DOCUMENTS

| 5,761,687 A | * | 6/1998 | Hon ............... G06F 17/273 704/246 |
| 6,182,059 B1 | * | 1/2001 | Angotti ............... G06N 5/04 706/45 |

(Continued)

OTHER PUBLICATIONS

Bing Liu, Sentiment Analysis and Opinion Mining, published by Morgan & Claypool Publishers, May 2012, pp. 1-168 (Year: 2012).*

(Continued)

*Primary Examiner* — Thuy Dao
*Assistant Examiner* — Zheng Wei
(74) *Attorney, Agent, or Firm* — Sheppard Mullin Richter & Hampton LLP

(57) ABSTRACT

According to an example, correlation based instruments discovery may include extracting text from content identified as being related to instruments for implementing machine readable instructions based products. An identified content object graph model having subjects and features may be generated. A product specifications object graph model having subjects and features may be generated based upon product specifications related to a machine readable instructions based product that is to be implemented. The subjects and features in the identified content object graph model that correspond to the subjects and features in the product specifications object graph model may be correlated and scored. Subjects and features from the identified content object graph model that include respective highest scores for matching subjects and features from the product specifications object graph model may be selected to identify a subset of the content that is related to instruments for implementing the machine readable instructions based product.

15 Claims, 7 Drawing Sheets

(51) Int. Cl.
*G06F 8/35* (2018.01)
*G06F 16/901* (2019.01)
*G06Q 10/10* (2012.01)

(56) References Cited

U.S. PATENT DOCUMENTS

| | | | | |
|---|---|---|---|---|
| 6,343,297 | B1* | 1/2002 | D'Anjou | G06F 8/20 |
| 6,694,482 | B1* | 2/2004 | Arellano | G06F 17/30017 |
| | | | | 707/E17.009 |
| 7,769,339 | B2* | 8/2010 | Burstein | G06F 17/27 |
| | | | | 434/353 |
| 7,818,288 | B1* | 10/2010 | Dickson | G06Q 10/00 |
| | | | | 707/601 |
| 7,912,843 | B2 | 3/2011 | Murdock et al. | |
| 8,290,921 | B2* | 10/2012 | Liu | G06F 17/30864 |
| | | | | 707/705 |
| 8,352,935 | B2 | 1/2013 | Isaacson et al. | |
| 8,607,213 | B2* | 12/2013 | Butler | G06F 8/61 |
| | | | | 717/168 |
| 8,701,078 | B1* | 4/2014 | Holler | G06F 8/35 |
| | | | | 717/101 |
| 8,789,009 | B2* | 7/2014 | Lee | G06F 8/35 |
| | | | | 717/104 |
| 9,015,161 | B2* | 4/2015 | Kuroiwa | G06K 9/00442 |
| | | | | 707/737 |
| 9,400,778 | B2* | 7/2016 | Ramani | G06F 17/2755 |
| 9,959,315 | B1* | 5/2018 | Gupta | G06F 17/30675 |
| 2002/0165717 | A1* | 11/2002 | Solmer | G06F 17/2775 |
| | | | | 704/256.4 |
| 2004/0153992 | A1* | 8/2004 | Molina-Moreno | G06F 8/35 |
| | | | | 717/105 |
| 2004/0243968 | A1* | 12/2004 | Hecksel | G06F 8/20 |
| | | | | 717/100 |
| 2005/0125746 | A1* | 6/2005 | Viola | G06F 17/30011 |
| | | | | 715/853 |
| 2005/0216882 | A1* | 9/2005 | Sundararajan | G06F 8/10 |
| | | | | 717/104 |
| 2006/0265702 | A1* | 11/2006 | Isaacson | G06F 8/61 |
| | | | | 717/168 |
| 2007/0143751 | A1* | 6/2007 | Butler | G06F 8/61 |
| | | | | 717/174 |
| 2007/0214189 | A1* | 9/2007 | Groble | G06F 17/278 |
| 2007/0233656 | A1* | 10/2007 | Bunescu | G06F 17/278 |
| 2007/0244904 | A1* | 10/2007 | Durski | G06F 8/30 |
| 2007/0260564 | A1* | 11/2007 | Peters | G06F 17/27 |
| | | | | 706/14 |
| 2007/0294074 | A1* | 12/2007 | Ciolfi | G06F 8/10 |
| | | | | 703/21 |
| 2008/0010629 | A1* | 1/2008 | Berg | G06F 8/36 |
| | | | | 717/116 |
| 2008/0109475 | A1* | 5/2008 | Burmester | G06F 17/2785 |
| 2008/0140644 | A1* | 6/2008 | Franks | G06F 17/30817 |
| 2008/0189402 | A1 | 8/2008 | Betzler et al. | |
| 2008/0201130 | A1* | 8/2008 | Peters | G06F 17/27 |
| | | | | 704/9 |
| 2008/0281904 | A1* | 11/2008 | Conrad | G06Q 30/02 |
| | | | | 709/203 |
| 2009/0006365 | A1* | 1/2009 | Liu | G06F 17/3064 |
| 2009/0112840 | A1* | 4/2009 | Murdock | G06Q 30/02 |
| 2009/0138793 | A1* | 5/2009 | Verma | G06F 8/10 |
| | | | | 715/234 |
| 2009/0183150 | A1* | 7/2009 | Felts | G06F 8/60 |
| | | | | 717/173 |
| 2009/0210419 | A1 | 8/2009 | Chitnis et al. | |
| 2009/0249284 | A1 | 10/2009 | Antosz et al. | |
| 2009/0327264 | A1 | 12/2009 | Yu et al. | |
| 2010/0280863 | A1 | 11/2010 | Wilcock et al. | |
| 2011/0072410 | A1* | 3/2011 | Lee | G06F 8/10 |
| | | | | 717/104 |
| 2011/0145226 | A1* | 6/2011 | Gollapudi | G06F 17/30867 |
| | | | | 707/723 |
| 2011/0208734 | A1* | 8/2011 | Verma | G06Q 10/10 |
| | | | | 707/728 |
| 2011/0231817 | A1 | 9/2011 | Hadar et al. | |
| 2011/0296374 | A1* | 12/2011 | Wu | G06F 17/2715 |
| | | | | 717/104 |
| 2012/0022952 | A1* | 1/2012 | Cetin | G06Q 10/04 |
| | | | | 705/14.73 |
| 2012/0095984 | A1* | 4/2012 | Wren-Hilton | G06F 17/30867 |
| | | | | 707/707 |
| 2012/0197631 | A1* | 8/2012 | Ramani | G06F 17/2755 |
| | | | | 704/9 |
| 2012/0198073 | A1 | 8/2012 | Srikanth et al. | |
| 2012/0284308 | A1* | 11/2012 | Paduroiu | G06F 17/273 |
| | | | | 707/780 |
| 2013/0110620 | A1* | 5/2013 | Zhu | G06F 17/30244 |
| | | | | 705/14.49 |
| 2013/0332822 | A1* | 12/2013 | Willmore | G06F 17/273 |
| | | | | 715/257 |
| 2014/0337372 | A1* | 11/2014 | Lee | G06F 8/30 |
| | | | | 707/767 |
| 2014/0369596 | A1* | 12/2014 | Siskind | G06F 17/3079 |
| | | | | 382/158 |
| 2015/0089346 | A1* | 3/2015 | Ye | G06F 17/243 |
| | | | | 715/226 |
| 2016/0103754 | A1* | 4/2016 | Aggarwal | G06Q 10/06 |
| | | | | 717/126 |
| 2017/0212725 | A9* | 7/2017 | Li | G06F 7/026 |

OTHER PUBLICATIONS

Mitchell et al., Vector-based Models of Semantic Composition, Proceedings of ACL-08: HLT, pp. 236-244, Columbus, Ohio, USA, Jun. 2008, pp. 236-244 (Year: 2008).*
Dell; "Software Inventory & Usage Management"; Aug. 15, 2007; 2 pages.
PCT Search Report/Written Opinion~Application No. PCT/IN2014/000290 dated Jan. 28, 2015~13 pages.
Sentiment Analysis and Subjectivity, Bing Liu 2010, 38 pages.

* cited by examiner

CORRELATION BASED INSTRUMENTS DISCOVERY

BACKGROUND

In the architecture and design phase of a software (i.e., machine readable instructions) based application, typically a search is performed for a set of instruments that are best suited to deliver an end solution. Instruments typically include various machine readable instructions based applications, libraries, and/or components that are needed to implement the end solution. The search is typically based on a set of specifications outlined by stakeholders associated with the end solution. Experts in a particular area associated with the end solution typically use their knowledge and recommendations from other experts to select a set of instruments that best meet the set of specifications and the end solution. For example, an expert typically analyzes the set of specifications and searches through a library of available instruments to select an instrument that best meets the set of specifications and the end solution.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
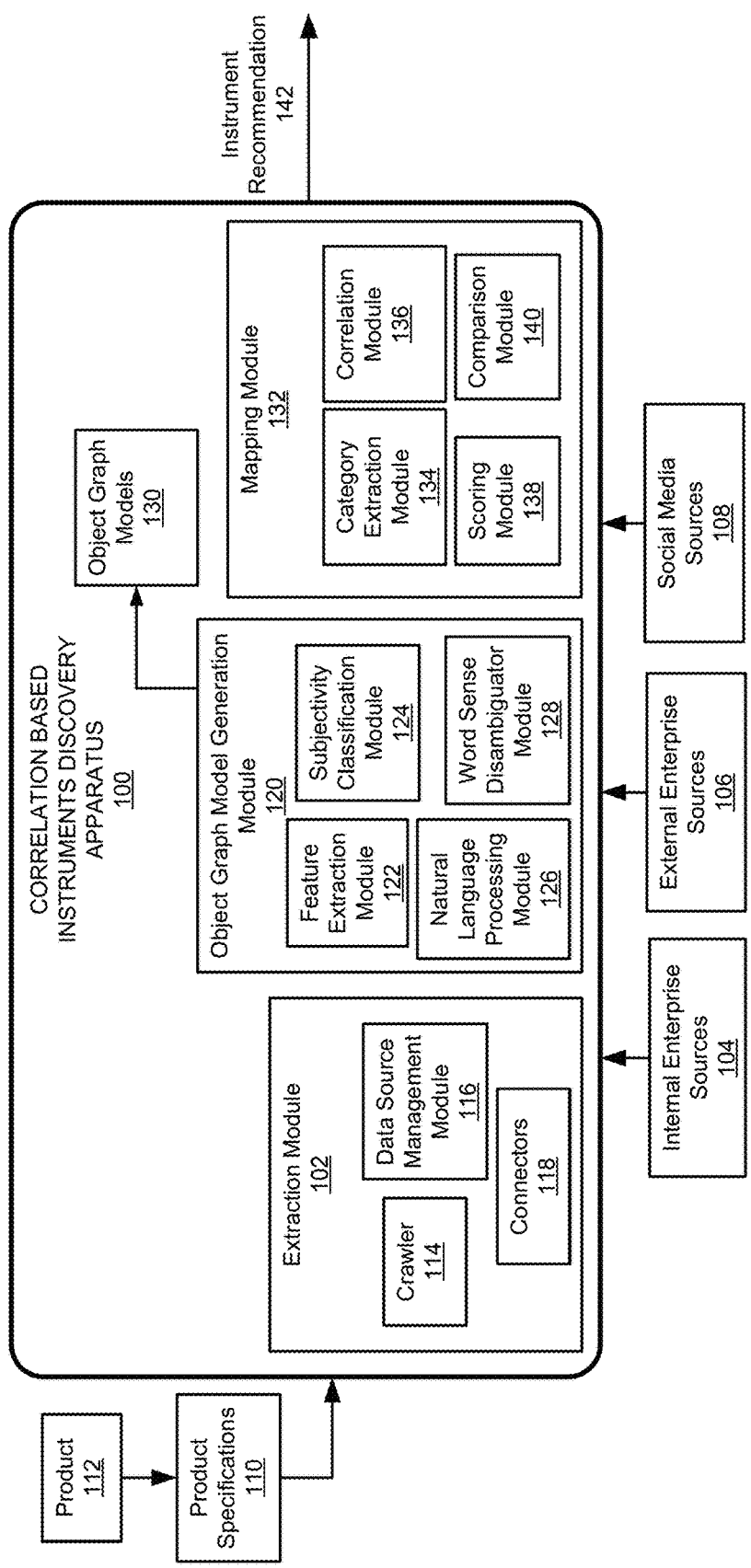
FIG. 1 illustrates an architecture of a correlation based instruments discovery apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

In the architecture and design phase of a machine readable instructions based application, typically an expert analyzes a set of specifications outlined by stakeholders associated with an end solution, and searches through a library of available instruments to select an instrument that best meets the set of specifications and the end solution. Such an analysis is limited to the set of instruments that are available to the expert, the expert's experience, and/or the expert's bias towards selection of a particular instrument. Such an analysis thus omits consideration of numerous other instruments that may also provide a competitive offering, without an expert even being aware of the existence of such other instruments. An objective comparison of available instruments is often time consuming, for example, due to the dynamic nature of new instruments that come into existence. Stakeholders are also limited to reliance on expert opinion due to their lack of knowledge of particular instruments related to an end solution. Stakeholders are further limited to having to use an instrument that is recommended by an expert, without having a metric that indicates how well an instrument meets the original set of specifications on an ongoing basis.

According to examples, a correlation based instruments discovery apparatus and a method for correlation based instruments discovery are disclosed herein. The apparatus and method disclosed herein provide for the discovery of instruments based on facts from a given set of user specifications. The apparatus and method disclosed herein may provide a comparative report of the comparison on what instrument works best for a particular set of user specifications. The user specifications may be provided as product specifications related to a product that is to be implemented. The product may include any generic entity, such as, for example, a machine readable instructions based application, or a machine readable instructions and hardware based computer component that is used, for example, for a machine readable instructions based implementation. A product specifications satisfaction index may be used to measure how close an instrument selection matches the user product specifications. A cost based comparison may also be provided as an indication of a total cost accrued for a particular instrument. The product specifications satisfaction index and the cost may provide a balance between cost and the instrument capabilities that may be used to provide the best value for cost solution.

The apparatus and method disclosed herein may be used to implement other aspects related to instrument selection, such as, for example, a specification based recommendation engine (i.e., a mapping module as described herein) for sizing, and for costs associated with instruments for different industries. The apparatus and method disclosed herein may also be used to implement a knowledge helpdesk on instruments that are regularly updated, hardware sizing to determine what configuration best suits a set of product specifications, etc.

Generally, the apparatus and method disclosed herein may combine internal enterprise sources, external enterprise sources, and social media sources to build a comprehensive ecosystem of instruments which can be used by different applications. The internal enterprise sources may include, for example, instrument specifications (e.g., features related to instruments), instrument inventories (e.g., types of available instruments), and/or product assets (e.g., products that use multiple instruments). The external enterprise sources may include, for example, product specification websites (e.g., websites for features related to instruments), vendor portals (e.g., websites for different vendors for different instruments), product documentation (e.g., general information related to instruments), product forums (e.g., forums related to specific products that use instruments), framework specifications (e.g., specifications related to structure of instruments), and/or knowledge management websites (e.g., comprehensive knowledge websites related to instruments). The social media sources may include, for example, blogs (e.g., social blogs related to instruments), forums (e.g., social forums related to instruments), and/or knowledge management systems (e.g., comprehensive social websites related to instruments).

The apparatus and method disclosed herein may capture a standard set of specifications for an end solution (i.e., product specifications). A template may be used to capture the set of specifications for an end solution. The template may include a technology independent format, such as, for example, Extensible Markup Language (XML) for capturing specifications, and ensuring capture of all needed information. The template may be used to extract information that a specific instrument needs. The template may be modified as needed based on modifications to the instruments, and/or product specifications for the end solution. Additionally or alternatively, the template may be modified as needed based on results related to the end solution so that the results are optimized at each successive implementation of the apparatus and method disclosed herein.

The apparatus and method disclosed herein may facilitate application rationalization. Application rationalization is typically a tedious and cumbersome process which involves a deep study of a portfolio of instruments, and then deciding which instruments need to be retained or used, and which instruments need to be replaced. The apparatus and method disclosed herein may also serve as a recommendation engine for identifying the instruments which align with an overall corporate strategy. The apparatus and method disclosed herein may further provide recommendations on the best strategy to perform rationalization.

The apparatus and method disclosed herein may provide a customized catalog. For example, the reach of instruments may be enhanced by providing a customized catalog for a given set of machine readable instructions applications.

The apparatus and method disclosed herein may provide an indication of whether the needs of a stakeholder are met with respect to an end solution. For example, projects that employ a variety of instruments typically do not have a clear picture of how effectively the instruments have been designed, and the degree to which they have met the specifications. The apparatus and method disclosed herein may ensure that stakeholders' needs are met, and the right instruments used in information technology (IT) are used to provide a solution to the stakeholders. A stakeholder may also be able to determine the best combination of solutions that fits a budget and matches all of the stakeholders' needs.

The apparatus and method disclosed herein may be used to provide support for a company's portfolio of instruments with fact based recommendations to thus increase the probability of a customer adopting a certain product as it is backed by the customer specifications. The apparatus and method disclosed herein may provide for feature discovery, which may be used to perform a more economical instrument rationalization within a project. Based on a wider choice of available instruments, a project may also be sized based on a budget. The apparatus and method disclosed herein may also facilitate licensing of products based on the identification of appropriate instruments for a given project. With respect to knowledge and helpdesk systems, data that is needed to implement such systems may be enhanced within an enterprise with more updated content. For example, the apparatus and method disclosed herein may provide an efficient way of obtaining the best and latest content crowd sourced and coupled with facts. The apparatus and method disclosed herein may also facilitate implementation of a services ecosystem based on the instruments that are discovered for a particular project. Further, the apparatus and method disclosed herein may be implemented in a variety of domains, such as, for example, healthcare, education, tourism, travel, eCommerce, etc.

FIG. 1 illustrates an architecture of a correlation based instruments discovery apparatus (hereinafter also referred to as "apparatus 100"), according to an example of the present disclosure. Referring to FIG. 1, the apparatus 100 is depicted as including an extraction module 102 to receive content from a variety of sources that include internal enterprise sources 104, external enterprise sources 106, and social media sources 108 to build a comprehensive ecosystem of instruments, which may be used by different applications. The internal enterprise sources 104 may include, for example, instrument specifications, instrument inventories, and/or product assets. The external enterprise sources 106 may include, for example, product specification websites, vendor portals, product documentation, product forums, framework specifications, and/or knowledge management websites. The social media sources 108 may include, for example, blogs, forums, and/or knowledge management systems. As described herein with reference to FIGS. 1 and 2, the extraction module 102 may receive product specifications 110 related to a product 112, and extract data from the internal enterprise sources 104, the external enterprise sources 106, the social media sources 108, and the product specifications 110. The extraction module 102 may include a crawler 114, a data source management module 116, and connectors 118, the operation of each of which is described below, to extract the data from the internal enterprise sources 104, the external enterprise sources 106, the social media sources 108, and the product specifications 110.

An object graph model generation module 120 is to extract the subjectivity being described in the text of the data from the internal enterprise sources 104, the external enterprise sources 106, the social media sources 108, and the product specifications 110. Further, the object graph model generation module 120 may extract the features and the sentiment if any associated with those features using techniques such as subjectivity extraction and classification, implicit and explicit feature detection, and word sense disambiguation. The object graph model generation module 120 may include a feature extraction module 122, a subjectivity classification module 124, a natural language processing module 126, and a word sense disambiguator module 128, the operation of each of which is described below, to generate object graph models 130 of subjects that are identified by the object graph model generation module 120. Generally, the object graph model generation module 120 may perform subjectivity, and implicit and explicit feature extraction on the extracted text from the identified content of the internal enterprise sources 104, the external enterprise sources 106, and the social media sources 108, to generate an identified content object graph model. Further, the object graph model generation module 120 may perform subjectivity, and implicit and explicit feature extraction on the text from the product specifications 110 to generate a product specifications object graph model.

A mapping module 132 is to identify subjects and features in the identified content object graph model that correspond to subjects and features in the product specifications object graph model. The mapping module 132 may correlate, and score the correlation of, the identified subjects and features in the identified content object graph model to the subjects and features in the product specifications object graph model. Further, the mapping module 132 may select subjects from the identified content object graph model that include respective highest scores for matching subjects from the product specifications to identify instruments for implementing the machine readable instructions based product. The mapping module 132 may include a category extraction module 134, a correlation module 136, a scoring module 138, and a comparison module 140, the operation of each of which is described below, to generate an instrument recommendation 142 based on a subset with the highest match. The instrument recommendation 142 may be further optimized using learning capabilities to fine tune the output for more accurate matches. Generally, the mapping module 132 may compare the data patterns extracted from the internal enterprise sources 104, the external enterprise sources 106, and the social media sources 108, with the data patterns available from the product specifications 110. The mapping module 132 may perform text analytics and word/text ranking to determining the word categories, subjectivity with implicit and explicit features detection, tone of the sentences, and assign a score to each matching entity. A correlation model may be generated to arrive at an index, and to determine the degree of match between the entities. A comparison may be performed with all entities and their associated features to determine the overall score, and to arrive at the final index. Based on the comparison, the greatest matching subset may be presented as the instrument recommendation 142.

The modules and other elements of the apparatus 100 may be machine readable instructions stored on a non-transitory computer readable medium. In this regard, the apparatus 100 may include or be a non-transitory computer readable medium. In addition, or alternatively, the modules and other elements of the apparatus 100 may be hardware or a combination of machine readable instructions and hardware.

Figure 2:
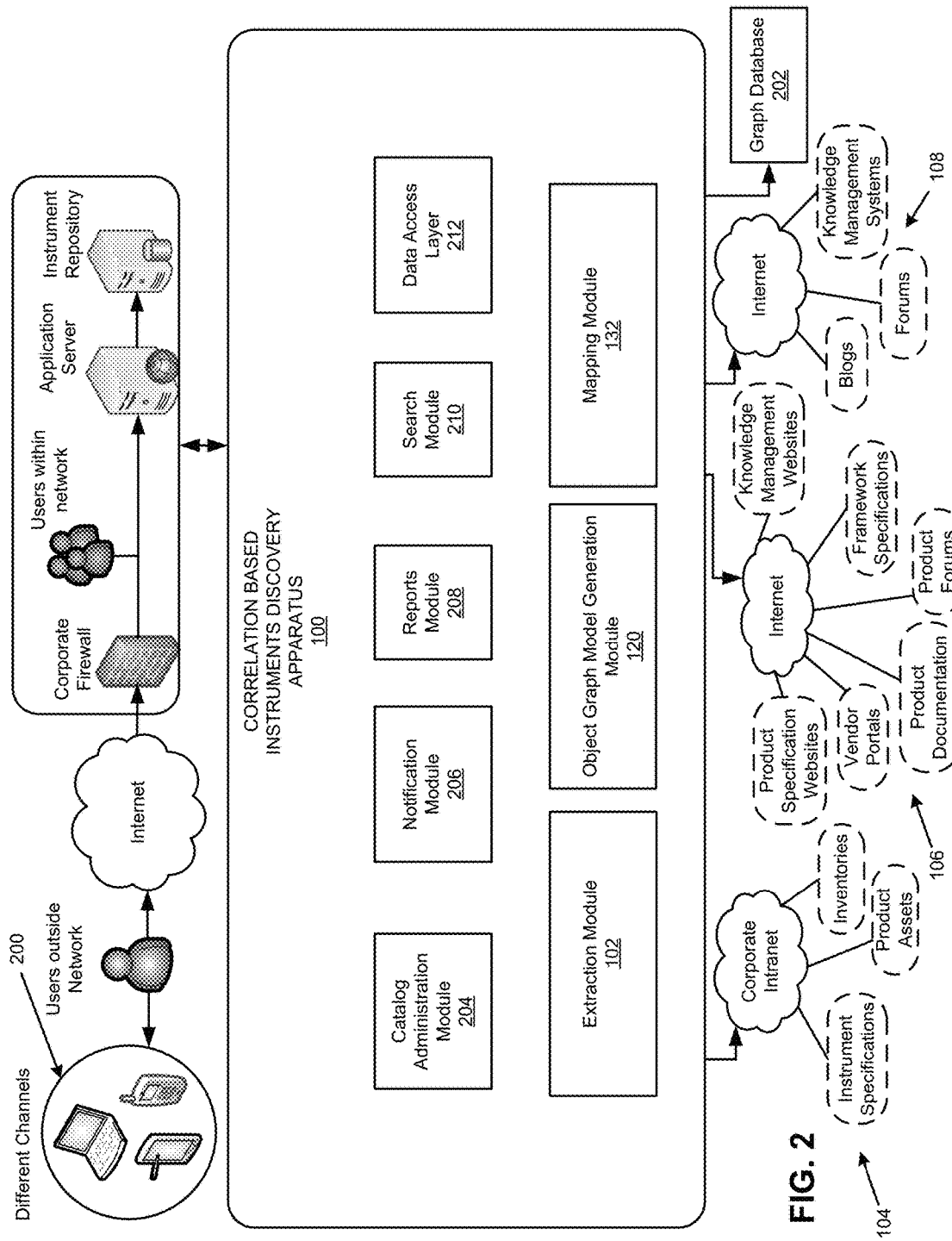
FIG. 2 illustrates further details of the correlation based instruments discovery apparatus of FIG. 1, according to an example of the present disclosure.

Referring to FIGS. 1 and 2, the crawler 114 of the extraction module 102 may extract text from content of the product specifications 110, and from the internal enterprise sources 104, the external enterprise sources 106, and the social media sources 108. The internal enterprise sources 104, the external enterprise sources 106, the social media sources 108 may be configurable, and updated with newer content. The crawler 114 may operate in conjunction with a scheduler to implement automatic (e.g., without human intervention) updates related to the crawling operation.

The data source management module 116 of the extraction module 102 may manage various aspects of the extraction. For example, the data source management module 116 manages the uniform resource locators (URLs) that are to be accessed for the internal enterprise sources 104, the external enterprise sources 106, and the social media sources 108. According to another example, the data source management module 116 manages how many times the URLs are to be accessed, and/or sequence of the URLs that are to be accessed.

The connectors 118 of the extraction module 102 may provide the connection to a variety of sources that include internal enterprise sources 104, the external enterprise sources 106, and the social media sources 108. Referring to FIGS. 1 and 2, the connectors 118 may be used to connect to the internal enterprise sources 104 via a corporate intranet. Further, the connectors 118 may be used to connect to the external enterprise sources 106 and the social media sources 108 via the Internet. Generally, the connectors 118 may provide the connection to communicate with a specific type of data source.

The feature extraction module 122 of the object graph model generation module 120 may extract features and the sentiment, if any, associated with the features. The features and sentiment may be extracted based on implicit and explicit feature detection, and word sense disambiguation determined by the word sense disambiguator module 128. The implicit and explicit feature detection may identify what specific feature is being described within a sentence and for a particular subject. For example, a sentence may discuss the feature of a screen for a mobile phone. The implicit feature detection may be based, for example, on an evaluation of content adjacent the content that is being evaluated.

The subjectivity classification module 124 of the object graph model generation module 120 may extract the subjectivity being described in the text. The subjectivity may be extracted based on subjectivity extraction and classification. For example, the subjectivity classification module 124 extracts the subjectivity being described in a sentence (e.g., what the sentence is describing, what is the subject, etc.). For example, a sentence may discuss the feature of a screen for a subject of a mobile phone.

The natural language processing module 126 of the object graph model generation module 120 may be used for language processing for content of the internal enterprise sources 104, the external enterprise sources 106, the social media sources 108, and the product specifications 110. The natural language processing module 126 may derive meaning from the content of the internal enterprise sources 104, the external enterprise sources 106, the social media sources 108, and the product specifications 110. The feature extraction module 122, the subjectivity classification module 124, and the word sense disambiguator module 128 may all be part of the natural language processing module 126.

The object graph model generation module 120 may generate the object graph models 130 for entities (e.g., subjects) that are extracted by the extraction module 102. The object graph model 130 may be generated for each entity that is discovered in the text content. The object graph model 130 may be built by linking each subject and the features that are related to that subject and other appropriate subjects. Similarly, subjects may be linked to other appropriate subjects. In this manner the object graph model 130 may include multiple relationships between subjects and features.

The information determined by the object graph model generation module 120 may be stored in a graph database 202. The graph database 202 may be organized to store the object graph models 130 that include multiple relationships between subjects and features. In this manner, the object graph models 130 may be navigated to ascertain subjects and associated subjects and/or features. For example, a particular server may be created as a subject and include a plurality of features. The features may be specified, for example, in a product specification website for one of the external enterprise sources 106. The subject of the particular server may be further linked to subjects of other servers and related features to provide the object graph model 130 for servers.

The category extraction module 134 of the mapping module 112 may extract the appropriate category of entities from the graph database 202 for analyzing the product specifications 110 against the appropriate content from the internal enterprise sources 104, the external enterprise sources 106, and the social media sources 108. For example, as described herein, the category extraction module 134 may identify subjects and features in the identified content object graph model that correspond to subjects and features in the product specifications object graph model.

The correlation module 136 of the mapping module 112 may correlate the data extracted by the extraction module 102 to the object graph model 130 generated by the object graph model generation module 120 to determine the nearest set of matching subjects and features. The correlation module 136 may create a correlation model to arrive at the index, and to determine the degree of match between the entities. For example, as described herein, the correlation module 136 may correlate the identified subjects and features in the identified content object graph model to the subjects and features in the product specifications object graph model.

The scoring module 138 of the mapping module 112 may use the correlation performed by the correlation module 136 to determine the nearest set of matching objects and features by scoring the subjects and features. The scoring module 138 may include text analytics and word/text ranking capabilities to determine the word categories, subjectivity with implicit and explicit features detection, tone of the sentences, and assign a score to each matching entity. For example, as described herein, the scoring module 138 may score the correlation of the identified subjects and features in the identified content object graph model to the subjects and features in the product specifications object graph model. An example of a scoring pattern used by the scoring module 138 may match a predetermined number of features for a given subject to the predetermined number of features for another given subject.

The comparison module 140 of the mapping module 112 may compare the data patterns extracted from the internal enterprise sources 104, the external enterprise sources 106, and the social media sources 108, with the data patterns available from the product specifications 110. Alternatively or additionally, the comparison module 140 may compare the data patterns extracted from the web with the data patterns available from the product specifications 110. The comparison module 140 may compare all entities and their associated features to determine the overall score, and to arrive at a final index. The greatest matching subset may be presented as the instrument recommendation 142. For example, as described herein, the comparison module 140 may select subjects and features from the identified content object graph model that include respective highest scores for matching subjects and features from the product specifications object graph model to identify instruments for implementing the machine readable instructions based product (i.e., the product 112).

As shown in FIG. 2, at 200, the information such as the product specifications 110 and the instrument recommendation 142 may be respectively received from and provided to a user via a variety of channels. For example, the channels include mobile phones, tablets, etc.

As shown in FIG. 2, the apparatus 100 may include various other components, such as, for example, a catalog administration module 204, a notification module 206, a reports module 208, a search module 210, and a data access layer 212. The catalog administration module 204 may be used to define terms (e.g., any subjects, features) that are used in the graph database 202. The notification module 206 may be used to trigger alerts related to the content of the graph database 202. For example, based on the identification of a certain subject, feature, or score, an alert may be triggered. The reports module 208 may generate reports related, for example, to a cost based comparison as an indication of a total cost accrued for a particular instrument. The reports may include a product specifications satisfaction index, and the cost may provide a balance between cost and the instrument capabilities that may be used to provide the best value for cost solution. The search module 210 may be used to enter a search term, and may search through the graph database 202 to generate results related to the search term. The data access layer 212 may be used to access the object graph model data stored in the graph database 202.

Figure 3:
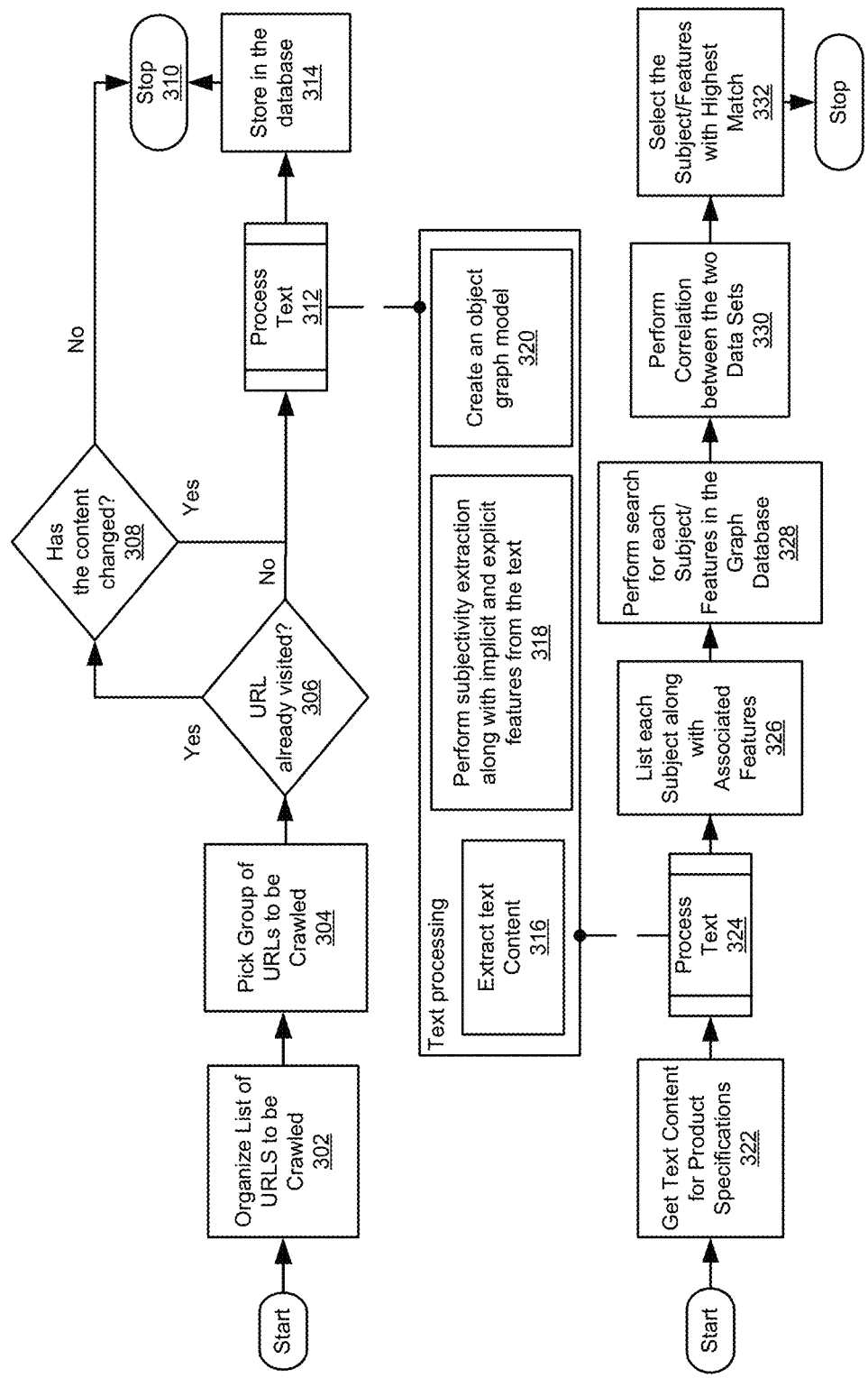
FIG. 3 illustrates a flowchart of correlation based instruments discovery, according to an example of the present disclosure.

FIG. 3 illustrates a flowchart 300 of correlation based instruments discovery, according to an example of the present disclosure.

Referring to FIG. 3, at block 302, the data source management module 116 of the extraction module 102 may organize a list of URLs to be crawled as categories for the purpose of scheduling. For example, the data source management module 116 may identify content related to instruments for implementing machine readable instructions based products from the internal enterprise sources 104, the external enterprise sources 106, and the social media sources 108.

At block 304, the data source management module 116 of the extraction module 102 may pick a group of URLs associated with a particular category to be crawled.

At block 306, for each URL that is picked at block 304, a determination is made as to whether a URL of the URLs identified at block 304 has already been visited.

In response to a determination that the URL of the URLs identified at block 304 has already been visited, at block 308, a determination is made as to whether content associated with the URL has changed.

In response to a determination that content associated with the URL has not changed, at block 310, further processing related to the URL of the URLs identified at block 304 is stopped.

In response to a determination that content associated with the URL has changed, or in response to a determination that the URL of the URLs identified at block 304 has not been visited, at block 312, the extraction module 102 and the object graph model generation module 120 may process text from the URL. For example, according to a network monitoring tool example described herein, the URLs subject to the extraction include URL1 and URL2. At block 314, the text processed by the extraction module 102 and the object graph model generation module 120 may be stored as the object graph models 130 in the graph database 202.

At block 316, the extraction module 102 may extract text content from the URL of the URLs identified at block 304. Instead of separate extractors, a common strategy may be followed, which is to convert the URL content into plain text after removing the HyperText Markup Language (HTML) tags from HTML pages, and then performing context and subjectivity extraction.

At block 318, the object graph model generation module 120 may perform subjectivity extraction, along with extraction of implicit and explicit features from the text. For example, the feature extraction module 122, the subjectivity classification module 124, and the word sense disambiguator module 128 may perform subjectivity extraction, along with extraction of implicit and explicit features from the text. For the network monitoring tool example described herein, URL1 may yield "SolarWinds Network Configuration Manager" as a subject with features, attributes, and/or properties as "manage complex network environments", "automated network discovery", "importing discovered devices", etc. URL1 may yield many other subject and associated features, attributes, and/or properties.

Figure 4:
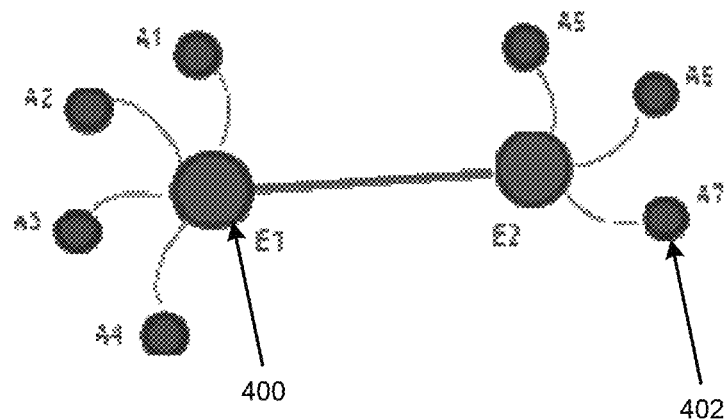
FIG. 4 illustrates a product specifications object graph model for a network monitoring tool example described herein, according to an example of the present disclosure.

At block 320, the object graph model generation module 120 may generate the object graph models 130 of subjects and features that are extracted by the object graph model generation module 120. FIG. 4 illustrates an object graph model for the network monitoring tool example described herein. The object graph model may represent entities and associated features, attributes, and/or properties. The object graph model may be visualized as a node with multiple branches. Referring to FIG. 4, the nodes (i.e., entities) may be represented as larger circles at 400, and the associated features, attributes, and/or properties that are determined from specific content may be represented as smaller circles at 402. For example, nodes E1 and E2 may represent entities, and A1-A7 may represent the associated features, attributes, and/or properties. A node (e.g., E1) may be related to another node (e.g., E2) through an implicit or an explicit relationship based on the content. Further, an attribute may itself become a node if it has other discovered attributes in the content.

For the network monitoring tool example described herein, a product specifications object graph model may be designated as G1, and identified content object graph models for URL1 and URL2 may be respectively designated as G2 and G3.

At block 322, the text for the product specifications 110 related to the product 112 may be received. For example, for the network monitoring tool example described herein, the text for the product specifications 110 may indicate "we need a network monitoring tool for our large network. We need to monitor routers, switches, firewalls, different circuits, VPN connections and servers to name a few. The number of devices is expected to be more than 500 and hence we need a robust tool for capturing data from a large number of devices. We would like something that has all of the features but does not have a large footprint and it should not interrupt normal activity, such as causing the core switches and CPU to spike. We would also like to have a vendor with great tech support who will assist with the installation and teach the engineers of the proper usage and capabilities of the tool."

At block 324, the extraction module 102 and the object graph model generation module 120 may process the text from the product specifications 110. Specifically, at block 316, the extraction module 102 may extract text content from the product specifications 110. At block 318, the object graph model generation module 120 may perform subjectivity extraction, along with extraction of implicit and explicit features from the text. For example, the feature extraction module 122, the subjectivity classification module 124, and the word sense disambiguator module 128 may perform subjectivity extraction, along with extraction of implicit and explicit features from the text. At 320, a product specifications object graph model may be generated for the product specifications 110.

For the network monitoring tool example described herein, the product specifications 110 refer to network monitoring tool and network as two entities which may be treated as subjects. Referring to FIG. 4, assuming the object graph model of FIG. 4 represents the product specifications object graph model G1, these entities may be symbolically visualized as E1 and E2 respectively (i.e., the primary subjects). The network monitoring tool (E1's) attributes are "footprint" as "low", "interrupt normal activity" as "minimal", "vendor tech support" as "great", and "installation" as "assist/assistance". The network (E2's) attributes are "size" as "large", "monitor" as "routers, switches, firewalls, different circuits, VPN connections, and servers", and "number of devices" as "more than 500". E1 and E2 may be related to each other in the first sentence which indicates that E1 is used to monitor E2. The attributes "routers", "firewalls", "VPN Connections", and "servers" may themselves operate as subjects or nodes, may include further attributes based on the content from other parts of the text, and may be related in a similar manner.

At block 326, with respect to the product specifications 110, the mapping module 132 may list each subject and its associated features.

At block 328, the mapping module 132 may perform a search for each subject and its associated features in the graph database 202. For example, the category extraction module 134 may identify subjects and features in the identified content object graph model that correspond to subjects and features in the product specifications object graph model.

At block 330, the correlation module 136 may perform a correlation between the entities of the product specifications 110 and entities retrieved from the graph database 202. For example, the correlation module 136 may correlate the identified subjects and features in the identified content object graph model to the subjects and features in the product specifications object graph model. For the network monitoring tool example described herein, the correlation module 136 may perform a correlation between G1-G2, and G1-G3 to extract the highest optimum results. Each node of the object graph models G1, G2, and G3 may be iterated, and the features, attributes, and/or properties may be examined. Various scenarios may exist in the correlation process. For example, a simple case may be where G2's or G3's attribute values are similar to that of G1. In such cases, identification may involve a text comparison. However, the attribute values of G2 or G3 may be synonyms or contextually similar terms to the attribute values of G1. In this regard, a combination of word sense disambiguation techniques may be coupled with using a dictionary of words or capabilities of a the natural language processing module 126. For example, a lexical database such as WORDNET may be used. In this regard, nouns, verbs, adjectives, and adverbs may be grouped into sets of cognitive synonyms (i.e., synsets), each expressing a distinct concept. Synsets may be interlinked by conceptual-semantic and lexical relations. The resulting network of meaningfully related words and concepts may be navigated using application programming interfaces (APIs). Nouns, verbs, adjectives, and adverbs may be distinguished based on their use of different grammatical rules. Every synset may include a group of synonymous, words, or collocations (a collocation is a sequence of words that form a specific meaning, such as "car pool"). Different senses of a word may be in different synsets. Every attribute value in a source (e.g., G1) may be analyzed against each attribute value in targets (e.g., G2, G3, . . . etc.) within the WORDNET hierarchy.

Figure 5:
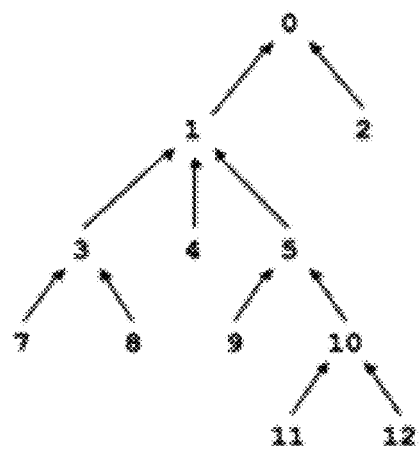
FIG. 5 illustrates word arrangement for correlation, according to an example of the present disclosure.

FIG. 5 illustrates word arrangement for correlation, according to an example of the present disclosure. Referring to FIG. 5, if "8" is an attribute value from G1, and "5" is an attribute value from G2, the shortest distance between these two words (5→1→3→8) may be treated as a measure of how close these match. Similarly if "8" is an attribute value from G1, and "12" is an attribute value from G3, the shortest distance between these two (12→10→5→1→3→8) may be treated as a measure of how close these attributes match. In the first case, the distance is 3 (n–1, where n is 4 and represents the number of nodes in the path), and in the second case the distance is 5 (n–1, where n is 6). Thus the shortest value in these two correlations (G1→G2 and G1→G3) yields 3 as the highest optimum result, and thus G2 may be chosen as a potential search result. Further analysis may be performed for other attributes.

The scoring module 138 may score the correlation between the entities of the product specifications 110 and entities retrieved from the graph database 202. For example, the scoring module 138 may score the correlation of the identified subjects and features in the identified content object graph model to the subjects and features in the product specifications object graph model.

At block 332, the comparison module 140 may select the entities with the highest match and output the entities as the instrument recommendation 142. For example, the comparison module 140 may select the top five (or otherwise user-configurable) entities with the highest match, and output the entities as the instrument recommendation 142. For example, the comparison module 140 may select subjects and features from the identified content object graph model that include respective highest scores for matching subjects and features from the product specifications object graph model to identify instruments for implementing the product 112.

Figure 6:
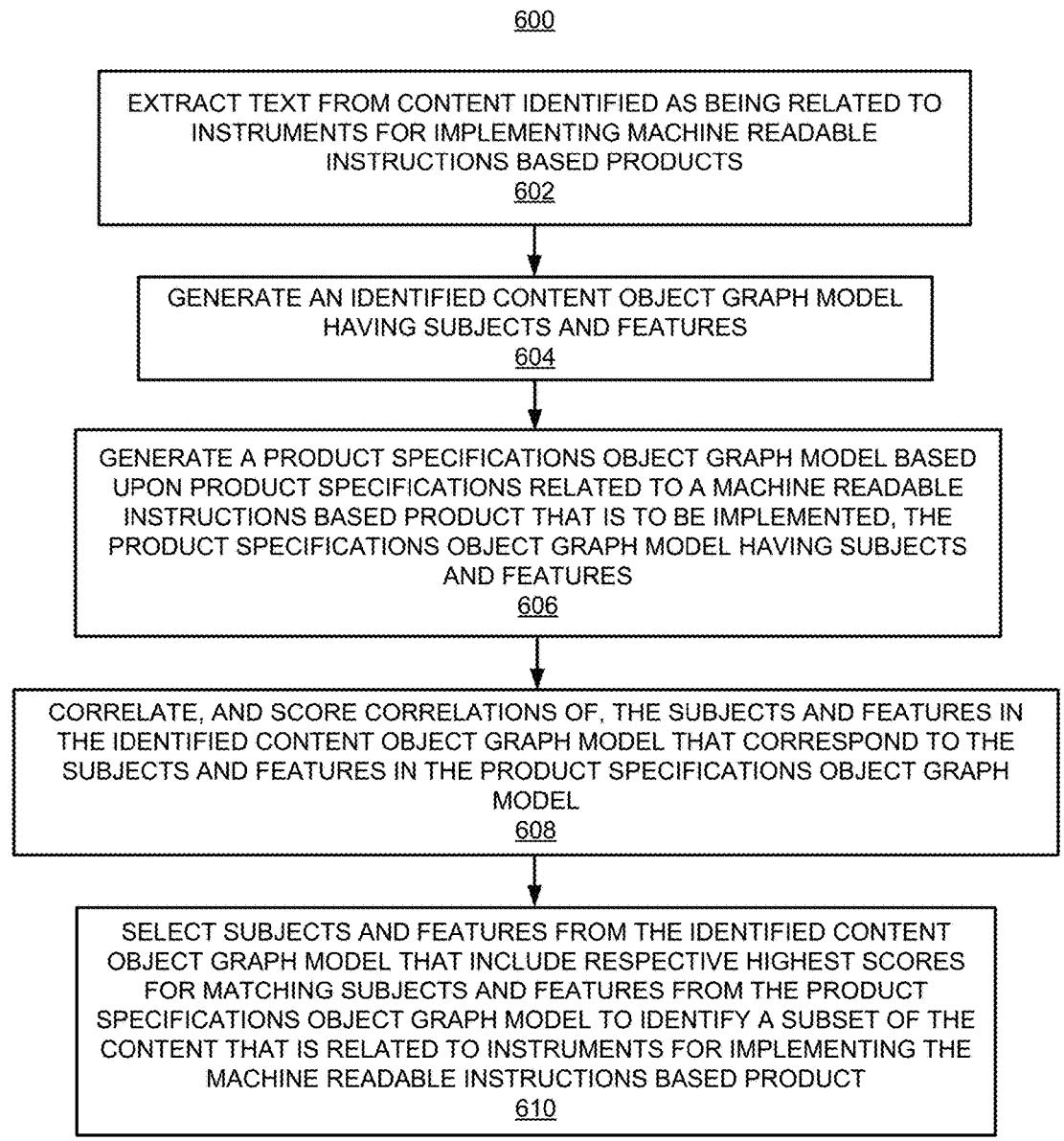
FIG. 6 illustrates a flowchart of a method for correlation based instruments discovery, according to an example of the present disclosure.
Figure 7:
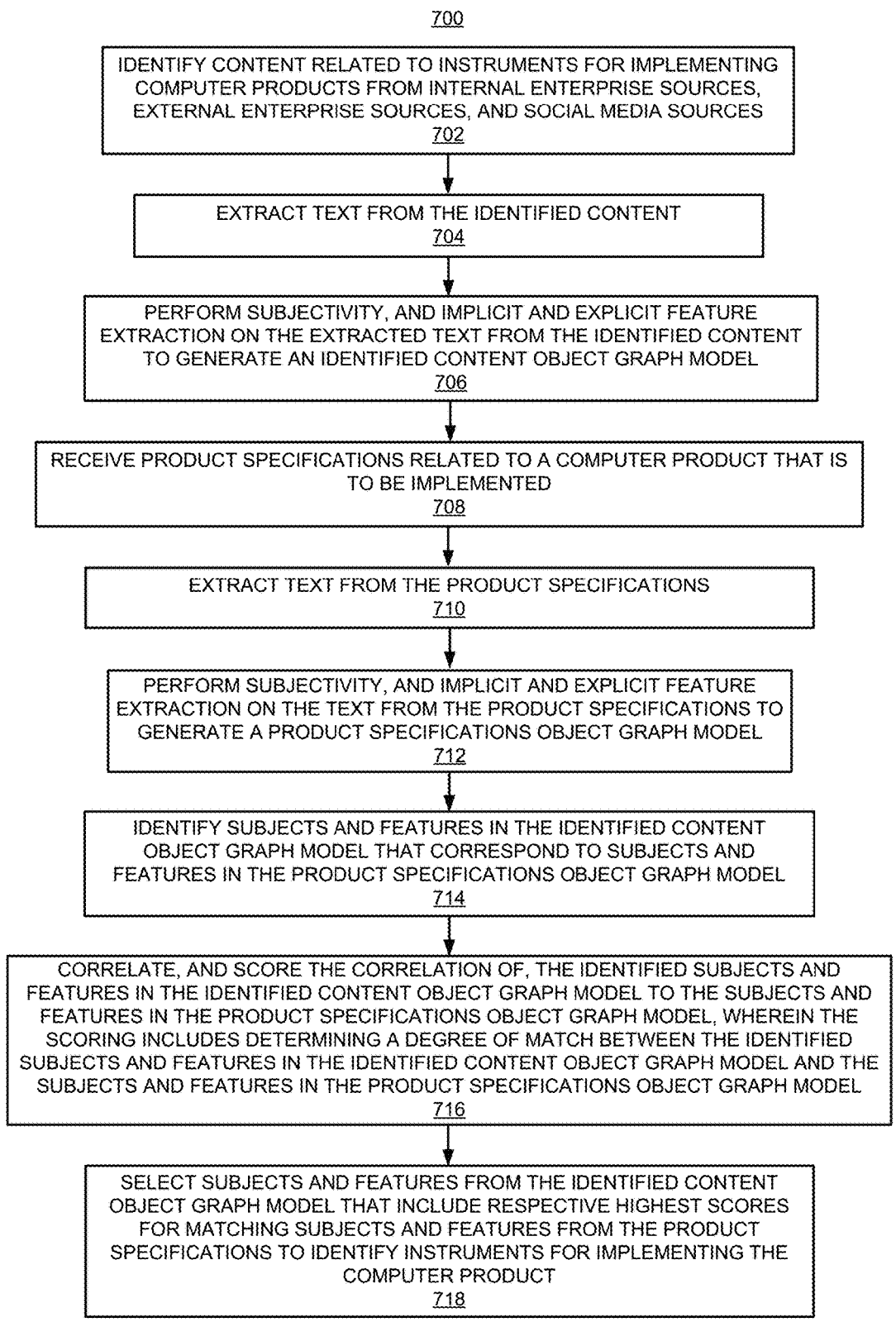
FIG. 7 illustrates further details of the flowchart of the method for correlation based instruments discovery, according to an example of the present disclosure.

FIGS. 6 and 7 respectively illustrate flowcharts of methods 600 and 700 for correlation based instruments discovery, corresponding to the example of the correlation based instruments discovery apparatus 100 whose construction is described in detail above. The methods 600 and 700 may be implemented on the correlation based instruments discovery apparatus 100 with reference to FIGS. 1-3 by way of example and not limitation. The methods 600 and 700 may be practiced in other apparatus.

Referring to FIG. 6, for the method 600, at block 602, the method may include extracting text from content identified as being related to instruments for implementing machine readable instructions based products. For example, referring to FIGS. 1 and 2, the extraction module 102 may extract text from content identified as being related to instruments for implementing machine readable instructions based products.

At block 604, the method may include generating an identified content object graph model having subjects and features. For example, referring to FIGS. 1 and 2, the object graph model generation module 120 may generate an identified content object graph model having subjects and features.

At block 606, the method may include generating a product specifications object graph model based upon product specifications related to a machine readable instructions based product that is to be implemented. For example, referring to FIGS. 1 and 2, the object graph model generation module 120 may generate a product specifications object graph model based upon the product specifications 110 related to a machine readable instructions based product that is to be implemented. The product specifications object graph model may include subjects and features.

At block 608, the method may include correlating, and scoring correlations of, the subjects and features in the identified content object graph model that correspond to the subjects and features in the product specifications object graph model. For example, referring to FIGS. 1 and 2, the mapping module 132 may correlate, and score correlations of, the subjects and features in the identified content object graph model that correspond to the subjects and features in the product specifications object graph model.

At block 610, the method may include selecting subjects and features from the identified content object graph model that include respective highest scores for matching subjects and features from the product specifications object graph model to identify a subset of the content that is related to instruments for implementing the machine readable instructions based product. For example, referring to FIGS. 1 and 2, the comparison module 140 may select subjects and features from the identified content object graph model that include respective highest scores for matching subjects and features from the product specifications object graph model to identify a subset of the content (e.g., as the instrument recommendation 142) that is related to instruments for implementing the machine readable instructions based product.

According to an example, extracting text from content identified as being related to instruments for implementing machine readable instructions based products may further include using a crawler to extract the text from content identified as being related to instruments for implementing machine readable instructions based products.

According to an example, extracting text from content identified as being related to instruments for implementing machine readable instructions based products may further include extracting text from content identified as being related to instruments for implementing machine readable instructions based products from internal enterprise sources, external enterprise sources, and social media sources.

According to an example, the method 600 may further include performing subjectivity and feature extraction on the extracted text from the identified content to generate the identified content object graph model having subjects and features. According to an example, performing subjectivity and feature extraction on the extracted text from the identified content to generate the identified content object graph model having subjects and features may further include performing implicit and explicit feature extraction on the extracted text from the identified content to generate the identified content object graph model having subjects and features.

According to an example, the method 600 may further include performing subjectivity and feature extraction on text from the product specifications to generate the product specifications object graph model having subjects and features. According to an example, performing subjectivity and feature extraction on text from the product specifications to generate the product specifications object graph model having subjects and features may further include performing implicit and explicit feature extraction on the text from the product specifications to generate the product specifications object graph model having subjects and features.

According to an example, scoring correlations of the subjects and features in the identified content object graph model that correspond to the subjects and features in the product specifications object graph model may further include determining a degree of match between the subjects and features in the identified content object graph model and the subjects and features in the product specifications object graph model.

Referring to FIG. 7, for the method 700, at block 702, the method may include identifying content related to instruments for implementing computer products from internal enterprise sources, external enterprise sources, and social media sources. For example, referring to FIGS. 1 and 2, the data source management module 116 may identify content related to instruments for implementing computer products from the internal enterprise sources 104, the external enterprise sources 106, and the social media sources 108.

At block 704, the method may include extracting text from the identified content. For example, referring to FIGS. 1 and 2, the crawler 114 may extract text from the identified content.

At block 706, the method may include performing subjectivity, and implicit and explicit feature extraction on the extracted text from the identified content to generate an identified content object graph model. For example, referring to FIGS. 1 and 2, the object graph model generation module 120 may perform subjectivity, and implicit and explicit feature extraction on the extracted text from the identified content to generate an identified content object graph model. The identified content object graph model may link subjects and features extracted from the text from the identified content.

At block 708, the method may include receiving product specifications related to a computer product that is to be implemented. For example, referring to FIGS. 1 and 2, the extraction module 102 may receive product specifications 110 related to a computer product (e.g., the product 112) that is to be implemented.

At block 710, the method may include extracting text from the product specifications. For example, referring to FIGS. 1 and 2, the crawler 114 may extract text from the product specifications 110.

At block 712, the method may include performing subjectivity, and implicit and explicit feature extraction on the text from the product specifications to generate a product specifications object graph model. For example, referring to FIGS. 1 and 2, object graph model generation module 120 may perform subjectivity, and implicit and explicit feature extraction on the text from the product specifications 110 to generate a product specifications object graph model. The product specifications object graph model may link subjects and features extracted from the text from the product specifications.

At block 714, the method may include identifying subjects and features in the identified content object graph model that correspond to subjects and features in the product specifications object graph model. For example, referring to FIGS. 1 and 2, the category extraction module 134 may identify subjects and features in the identified content object graph model that correspond to subjects and features in the product specifications object graph model.

At block 716, the method may include correlating, and scoring the correlation of, the identified subjects and features in the identified content object graph model to the subjects and features in the product specifications object graph model. For example, referring to FIGS. 1 and 2, the correlation module 136 and the scoring module 138 may respectively correlate, and score the correlation of, the identified subjects and features in the identified content object graph model to the subjects and features in the product specifications object graph model. The scoring may include determining a degree of match between the identified subjects and features in the identified content object graph model and the subjects and features in the product specifications object graph model.

At block 718, the method may include selecting subjects and features from the identified content object graph model that include respective highest scores for matching subjects and features from the product specifications object graph model to identify a subset of the content that is related to instruments for implementing the computer product. For example, referring to FIGS. 1 and 2, the comparison module 140 may select subjects and features from the identified content object graph model that include respective highest scores for matching subjects and features from the product specifications object graph model to identify a subset of the content (e.g., as the instrument recommendation 142) that is related to instruments for implementing the computer product.

Figure 8:
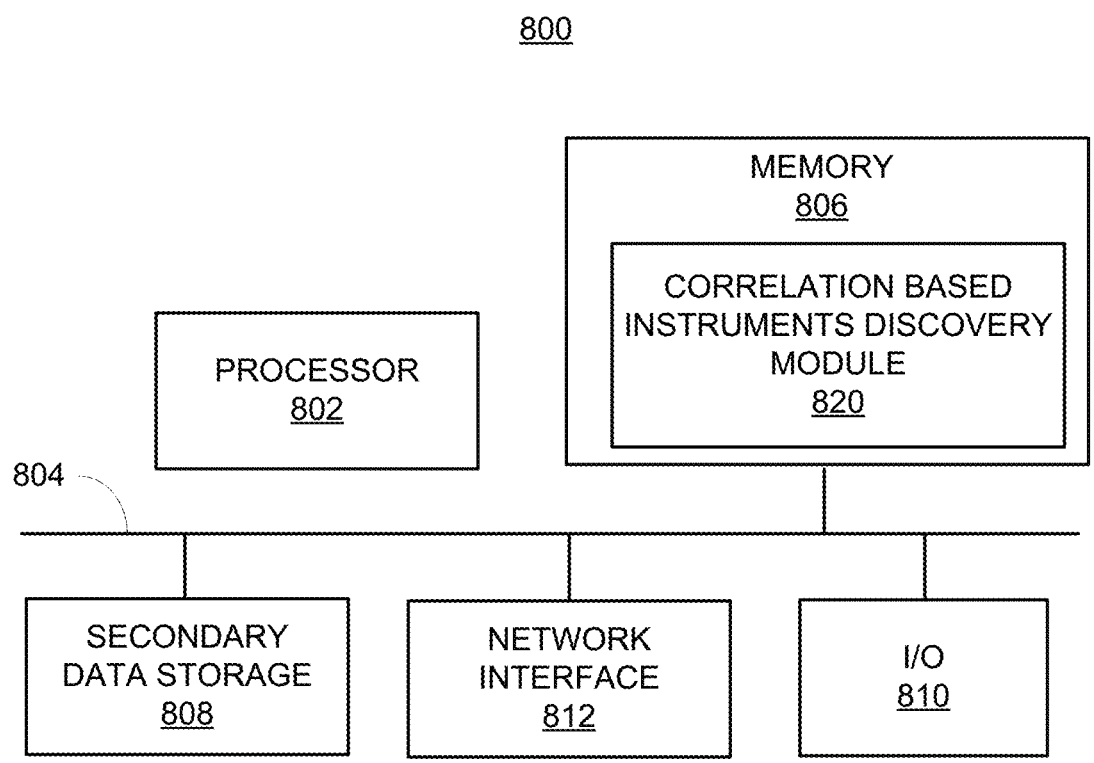
FIG. 8 illustrates a computer system, according to an example of the present disclosure.

FIG. 8 shows a computer system 800 that may be used with the examples described herein. The computer system 800 may represent a generic platform that includes components that may be in a server or another computer system. The computer system 800 may be used as a platform for the apparatus 100. The computer system 800 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 800 may include a processor 802 that may implement or execute machine readable instructions performing some or all of the methods, functions and other processes described herein. Commands and data from the processor 802 may be communicated over a communication bus 804. The computer system may also include a main memory 806, such as a random access memory (RAM), where the machine readable instructions and data for the processor 802 may reside during runtime, and a secondary data storage 808, which may be non-volatile and stores machine readable instructions and data. The memory and data storage are examples of computer readable mediums. The memory 806 may include a correlation based instruments discovery module 820 including machine readable instructions residing in the memory 806 during runtime and executed by the processor 802. The correlation based instruments discovery module 820 may include the modules of the apparatus 100 shown in FIG. 1.

The computer system 800 may include an I/O device 810, such as a keyboard, a mouse, a display, etc. The computer system may include a network interface 812 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for correlation based instruments discovery, the method comprising:

extracting text from content identified as being related to instruments for implementing machine readable instructions based products;

generating, by a processor, an identified content object graph model having first subjects and features, the first subjects and features being extracted from the text of the content;

generating a product specifications object graph model based upon product specifications related to a machine readable instructions based product that is to be implemented, the product specifications object graph model having second subjects and features;

correlating the first subjects and features in the identified content object graph model that correspond to the second subjects and features in the product specifications object graph model, wherein the correlating includes generating a word arrangement of the first and second subjects and features;

scoring correlations produced by the correlating, wherein the scoring includes calculating distances between words in the word arrangement; and selecting the first subjects and features from the identified content object graph model that include respective highest scores for matching the second subjects and features from the product specifications object graph model to identify a subset of the content that is related to instruments for implementing the machine readable instructions based product.

2. The method of claim 1, wherein extracting text from the content identified as being related to the instruments for implementing machine readable instructions based products further comprises:

using a crawler to extract the text from the content identified as being related to the instruments for implementing machine readable instructions based products.

3. The method of claim 1, wherein extracting text from the content identified as being related to the instruments for implementing machine readable instructions based products further comprises:

extracting text from the content identified as being related to the instruments for implementing machine readable instructions based products from internal enterprise sources, external enterprise sources, and social media sources.

4. The method of claim 3, wherein the internal enterprise sources include sources related to at least one of instrument specifications, instrument inventories, and product assets.

5. The method of claim 3, wherein the external enterprise sources include sources related to at least one of product specification websites, vendor portals, product documentation, product forums, framework specifications, and knowledge management websites.

6. The method of claim 3, wherein the social media sources include sources related to at least one of blogs, forums, and knowledge management systems.

7. The method of claim 1, further comprising:

performing subjectivity and feature extraction on the extracted text from the identified content to generate the identified content object graph model having the first subjects and features.

8. The method of claim 7, wherein performing the subjectivity and feature extraction on the extracted text from the identified content to generate the identified content object graph model having the first subjects and features further comprises:

performing implicit and explicit feature extraction on the extracted text from the identified content to generate the identified content object graph model having the first subjects and features.

9. The method of claim 1, further comprising:

performing subjectivity and feature extraction on text from the product specifications to generate the product specifications object graph model having the second subjects and features.

10. The method of claim 9, wherein performing the subjectivity and feature extraction on text from the product specifications to generate the product specifications object graph model having the second subjects and features further comprises:

performing implicit and explicit feature extraction on the text from the product specifications to generate the product specifications object graph model having the second subjects and features.

11. The method of claim 1, wherein scoring correlations of the first subjects and features in the identified content object graph model that correspond to the second subjects and features in the product specifications object graph model further comprises:

determining a degree of match between the first subjects and features in the identified content object graph model and the second subjects and features in the product specifications object graph model.

12. The method of claim 1, wherein the identified content object graph model links the first subjects and features from the extracted text from the identified content.

13. A correlation based instruments discovery apparatus comprising:

a processor; and a memory storing machine readable instructions that when executed by the processor cause the processor to:

identify content related to instruments for implementing computer products from internal enterprise sources, external enterprise sources, and social media sources;

extract text from the identified content;

perform subjectivity, and implicit and explicit feature extraction on the extracted text from the identified content to generate an identified content object graph model;

receive product specifications related to a computer product that is to be implemented;

extract text from the product specifications;

perform subjectivity, and implicit and explicit feature extraction on the text from the product specifications to generate a product specifications object graph model;

identify first subjects and features in the identified content object graph model that correspond to second subjects and features in the product specifications object graph model;

correlate the first subjects and features in the identified content object graph model to the second subjects and features in the product specifications object graph model, wherein the correlate includes to generate a word arrangement of the first and second subjects and features;

score correlations produced by the correlating, wherein the score correlations includes to calculate distances between words in the word arrangement; and select the first subjects and features from the identified content object graph model that include respective predetermined scores for matching the second subjects and features from the product specifications object graph model to identify a subset of the identified content that is related to instruments for implementing the computer product.

14. The correlation based instruments discovery apparatus according to claim 13, wherein the respective predetermined scores represent the highest scores.

15. A non-transitory computer readable medium having stored thereon machine readable instructions to provide correlation based instruments discovery, the machine readable instructions, when executed, cause a processor to:

identify content related to instruments for implementing computer products from internal enterprise sources, external enterprise sources, and social media sources;
extract text from the identified content;
perform, by a processor, subjectivity, and implicit and explicit feature extraction on the extracted text from the identified content to generate an identified content object graph model;
receive product specifications related to a computer product that is to be implemented;
extract text from the product specifications;
perform subjectivity, and implicit and explicit feature extraction on the text from the product specifications to generate a product specifications object graph model;
identify first subjects and features in the identified content object graph model that correspond to second subjects and features in the product specifications object graph model;
correlate the first subjects and features in the identified content object graph model to the second subjects and features in the product specifications object graph model, wherein the correlate includes to generate a word arrangement of the first and second subjects and features;
score correlations produced by the correlate, wherein the score includes determining a degree of match between the first subjects and features in the identified content object graph model and the second subjects and features in the product specifications object graph model, and wherein the score correlations includes to calculate distances between words in the word arrangement; and
select the first subjects and features from the identified content object graph model that include respective highest scores for matching the second subjects and features from the product specifications object graph model to identify a subset of the identified content that is related to instruments for implementing the computer product.

* * * * *